United States Patent
Coleman et al.

(10) Patent No.: US 6,604,839 B2
(45) Date of Patent: Aug. 12, 2003

(54) MULTI-CHIP LED COLOR MIXING BY DIFFRACTION

(75) Inventors: Christopher L. Coleman, Santa Clara, CA (US); Robert H. Weissman, Mountain View, CA (US)

(73) Assignee: Lumileds Lighting, U.S., LLC, San Jose, CA (US)

( * ) Notice: Subject to any disclaimer, the term of this patent is extended or adjusted under 35 U.S.C. 154(b) by 0 days.

(21) Appl. No.: 09/882,493

(22) Filed: Jun. 15, 2001

(65) Prior Publication Data

US 2002/0191394 A1 Dec. 19, 2002

(51) Int. Cl.[7] .............................. F21V 5/00; G02B 5/18
(52) U.S. Cl. ...................... 362/231; 362/244; 362/309; 362/800; 359/571
(58) Field of Search ................................ 362/230, 231, 362/244, 309, 800, 339, 555; 359/563, 571, 558

(56) References Cited

U.S. PATENT DOCUMENTS

| | | | |
|---|---|---|---|
| 5,153,751 A | 10/1992 | Ishikawa et al. .............. 359/13 |
| 5,323,302 A | * 6/1994 | Bertling et al. ............. 362/308 |
| 5,362,957 A | * 11/1994 | Nakai et al. ................. 359/571 |
| 5,477,436 A | 12/1995 | Bertling et al. ............. 362/231 |
| 5,803,579 A | 9/1998 | Turnbull et al. ............ 362/83.1 |
| 5,810,469 A | 9/1998 | Weinreich .................... 362/298 |
| 5,995,071 A | 11/1999 | Mertz ........................... 345/84 |
| 6,132,072 A | 10/2000 | Turnbull et al. ............ 362/494 |
| 6,139,166 A | 10/2000 | Marshall et al. ............. 362/231 |
| 6,392,806 B2 | * 5/2002 | Swanson ...................... 359/571 |
| 6,417,967 B1 | * 7/2002 | Swanson ...................... 359/571 |

OTHER PUBLICATIONS

Christopher L. Coleman, Robert H. Weissman, and Annette Grot, "Applications of Diffractive Optics With LED Sources," in Diffractive Optics and Micro–Optics, OSA Technical Digest (Optical) Society of America, Washington, DC., 2000, pp. 291–293.

Christopher L. Coleman, Robert H. Weissman, and Annette Grot, "Applications of Diffractive Optics with LED Sources", presentation at "Diffractive Optics and Micro–Optics 2000," Jun. 22, 2000, pp. 291–293.

H. Dammann, "Color Separation Gratings," Applied Optics, vol. 17, No. 15, Aug. 1978, pp. 2273–2279.

Weichung Chao, Sien Hi, Ching Yi Wu, and Chung J. Kuo, "Computer–Generated Holographic Diffuser for Color Blending Considering Divergent Sources," Opto–Electronics & Systems Laboratories, Industrial Technology Research Institute, pp. 100–107.

Weichung Chao, Sien Chi, Ching Yi Wu, and Chung J. Kuo, "Computer–Generated Holographic Diffuser for Color Mixing," Optics Communications, 151, May 15, 1998, pp. 21–24.

* cited by examiner

Primary Examiner—Y. My Quach-Lee
Assistant Examiner—Peggy A. Neils
(74) Attorney, Agent, or Firm—Patent Law Group LLP; Rachel V. Leiterman

(57) ABSTRACT

A light emitting device in accordance with an embodiment of the present invention includes a diffractive optical element, a first light emitting diode emitting first light having a first range of wavelengths, and a second light emitting diode emitting second light having a second range of wavelengths. The first light is directed onto the diffractive optical element at a first range of angles of incidence, and the second light is directed onto the diffractive optical element at a second range of angles of incidence. The diffractive optical element diffracts at least a portion of the first light and at least a portion of the second light into the same range of angles of diffraction to obtain light having a desired range of wavelengths. A light emitting device in accordance with an embodiment of the present invention can efficiently mix the outputs of two or more light emitting diodes to form a substantially uniform output of, for example, white light.

24 Claims, 7 Drawing Sheets

MULTI-CHIP LED COLOR MIXING BY DIFFRACTION

FIELD OF THE INVENTION

The present invention relates generally to semiconductor light emitting devices and more particularly to solid state light sources in which the outputs of several light emiting semiconductor devices are mixed.

BACKGROUND

The advent of high-brightness red, green, and blue light emitting diodes (LEDs), such as $In_xAl_yGa_{1-x-y}N$ and $In_xAl_yGa_{1-x-y}P$ LEDs, has generated strong interest in finding efficient ways to mix the outputs of several such LEDs to make a white light source. Such an LED-based white light source would have commercially attractive applications including illumination, decorative lighting, and display back-lighting.

In one approach to generating white light with multiple LEDs, the outputs of several LEDs of different colors are directed into a reflective mixing tube which spatially mixes light of different colors. Reflections from the walls of the tube produce virtual images of each light source which make the light sources appear to be spread over a larger area. Such mixing tubes only approximate the virtual overlap of the separated color sources, however. Hence, light of different colors is not uniformly mixed. Improved approximations require longer tube lengths and more reflections, which result in increased light loss.

In another approach to generating white light with multiple LEDs, the outputs of several LEDs of different colors are directed onto dichroic beam splitters which spatially overlap and mix the different colors. Unfortunately, such color mixing optical systems utilizing beam splitters can be complex, bulky, and expensive.

What is needed is an LED-based white light source in which the outputs of several LEDs are simply, efficiently, and uniformly mixed.

SUMMARY

A light emitting device in accordance with an embodiment of the present invention includes a diffractive optical element, a first light emitting diode emitting first light having a first range of wavelengths, and a second light emitting diode emitting second light having a second range of wavelengths. The first light is directed onto the diffractive optical element at a first range of angles of incidence, and the second light is directed onto the diffractive optical element at a second range of angles of incidence. The first light and the second light substantially overlap on the diffractive optical element. The diffractive optical element diffracts at least a portion of the first light and at least a portion of the second light into the same range of angles of diffraction to obtain light having a desired range of wavelengths.

The light emitting device may further include at least a third light emitting diode emitting third light having a third range of wavelengths. The third light is directed onto the diffractive optical element at a third range of angles of incidence such that at least a portion of the third light is diffracted into the same range of angles of diffraction as the portion of the first light and the portion of the second light. In one such embodiment, the first light includes blue light, the second light includes green light, the third light includes red light, and the diffractive optical element provides a white light output.

Advantageously, a light emitting device in accordance with an embodiment of the present invention can efficiently mix the outputs of two or more light emitting diodes to form a substantially uniform output substantially spatially and angularly overlapped in all subsequent regions.

BRIEF DESCRIPTION OF THE DRAWINGS

It should be noted that the dimensions in the figures are not necessarily to scale. Like reference numbers in the various figures denote like parts in the various embodiments.

DETAILED DESCRIPTION

Figure 1:
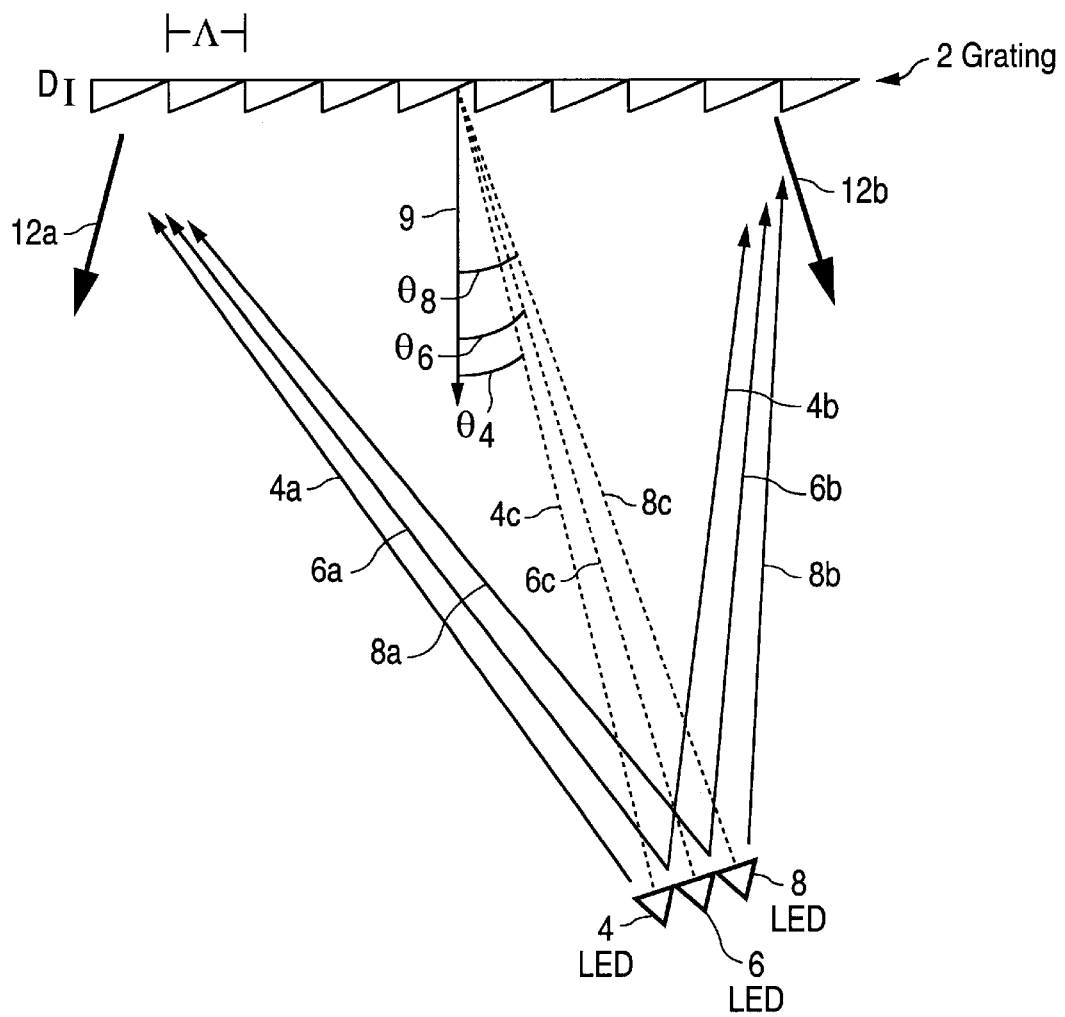
FIG. 1 is a schematic illustration of an optical system including a first-order diffraction grating in accordance with an embodiment of the present invention.

In accordance with embodiments of the present invention, a diffractive optical element mixes light output by two or more LEDs to provide output light of a desired color. In some implementations, the output light appears white to the human eye. Several embodiments will be described in which the diffractive optical element is an echelon diffraction grating or a first-order diffraction grating such as a first-order blazed diffraction grating or a multi-level approximation to a first-order blazed diffraction grating.

A diffraction grating is a diffractive optical element having a periodic structure that is typically characterized by its period $\Lambda$ expressed in units of distance. In accordance with embodiments of the present invention, the periodic structure may be, for example, a planar or curved optical surface including an array of parallel grooves spaced a distance $\Lambda$ apart. Alternatively, the periodic structure may be, for example, an optical surface or a volume of material having a spatially varying index of refraction with period $\Lambda$ and/or a spatially varying absorption constant with period $\Lambda$. Numerous diffraction gratings are known in the art and are commercially available.

Light incident on a diffraction grating is diffracted by the periodic structure of the grating. For a diffraction grating used in a reflection geometry, for example, the angular direction of the diffracted light depends on the wavelength of the light and the period of the grating according to the grating equation:

$$\Lambda(\sin(\theta_m) \pm \sin(\theta_i)) = m\lambda/n, \qquad (1)$$

where $\lambda$ is the wavelength of the diffracted light, n is the index of refraction of the medium in which the grating is immersed (n~1 in air, for example), $\theta_i$ is the angle at which the light is incident onto the grating (angle of incidence), $\theta_m$ is the angle at which light of wavelength $\lambda$ is diffracted from the grating (angle of diffraction), and m is an integer. The angle of incidence of a ray of light incident on the grating is measured between the incident ray and the vector perpendicular to the plane of the grating surface at the point on the grating on which the ray is incident. Similarly, the angle of diffraction of a ray of light diffracted from the grating is measured between the diffracted ray and the vector perpendicular to the plane of the grating surface. The plus sign in the grating equation applies if the incident and diffracted rays are on the same side of the vector perpendicular to the plane of the grating surface. A similar expression describes the angular direction of light diffracted from a diffraction grating used in a transmission geometry.

Diffraction gratings are commonly used to disperse light incident on the grating into its constituent colors. The dispersive nature of a diffraction grating is evident in the grating equation: given a common angle of incidence $\theta_i$ and particular integer value of m, different wavelengths $\lambda$ will leave the grating at different diffraction angles $\theta_m$ and hence in different directions. The smaller the grating period $\Lambda$, the greater the dispersion (difference in direction) of diffracted light of different wavelengths. The grating equation also reveals that the grating can diffract light of a particular wavelength incident at a particular angle of incidence into more than one direction. These different directions are known as diffraction orders and are indexed by the integer m in the grating equation. The fraction of the optical power at a particular wavelength of light diffracted into a particular diffraction order is known as the diffraction efficiency of that diffraction order. The diffraction efficiency of a diffraction order is a function of the angle of incidence, wavelength, and polarization of the light and of the detailed structure of the grating.

In accordance with embodiments of the present invention, diffraction gratings are used in reverse of their common usage in order to combine light of different colors (wavelengths) into a single output beam. In particular, light beams emitted by two or more LEDs and having different ranges of wavelengths are directed onto a diffraction grating at different angles such that the diffraction grating diffracts substantial portions of the incident light beams into the same direction to thus substantially overlap and combine the incident light beams to form an output light beam.

LEDs typically emit light having a spectral bandwidth ranging from about 10 nanometers (nm) to about 100 nm. Moreover, LED light sources typically produce large-angle radiation patterns. For example, LEDs packaged in light concentrating devices such as conventional compound parabolic concentrators or reflective cups of other shapes may emit light in a cone-shaped pattern having, for example, a half angle of about 15° or greater. Smaller half angles may be provided by larger packages. Consequently, a diffraction grating used in accordance with the present invention to combine different color outputs of several LEDs preferably works well in two or more regions of the visible light spectrum and over a wide range of angles of incidence.

The inventors have investigated the properties of various diffraction gratings to evaluate the feasibility of their use in accordance with embodiments of the present invention. In one class of diffraction gratings used in accordance with embodiments of the present invention the diffraction gratings have surface relief, such as grooves, which provide phase delays of between about 0 and about $2\pi$ at a particular design wavelength for light waves reflected from adjacent periods of the diffraction grating. Such diffraction gratings are referred to herein as "first-order gratings" for the design wavelength. First-order diffraction gratings can selectively diffract light of a broad range of different wavelengths near the design wavelength into the same diffraction order with high diffraction efficiency.

Referring to FIG. 1, for example, in one embodiment of the present invention LEDs 4, 6, and 8 emit beams of light that are directed to overlap on first-order diffraction grating 2. These light beams are, for example, approximately Gaussian light beams with angular divergences (half angles) of about 30°. The edges of the light beams emitted by LEDs 4, 6, and 8 are represented, respectively, by light rays 4a, 4b, 6a, 6b, 8a, and 8b. These edges mark, for example, the $1/e^2$ intensity levels (where "e" is the base of natural logarithms) of the beams. Light rays 4c, 6c, and 8c, which are shown as dashed lines to distinguish them from the other light rays, are directed along the centers of the light beams emitted by, respectively, LEDs 4, 6, and 8. Light rays 4c, 6c, and 8c are incident on grating 2 at, respectively, angles $\theta_4, \theta_6$, and $\theta_8$ with respect to a vector 9 oriented perpendicular to grating 2.

In the embodiment shown in FIG. 1, LEDs 4, 6, and 8 emit, respectively, blue, green, and red light with emission spectra centered at about, respectively, $\lambda_{blue}$~470 nm, $\lambda_{green}$~540 nm, and $\lambda_{red}$~610 nm. The blue and green LEDs may be, for example, $In_xAl_yGa_{1-x-y}N$ devices in which $0 \leq x \leq 1$, $0 \leq y \leq 1$, and $0 \leq x+y \leq 1$. The emission spectra of such $In_xAl_yGa_{1-x-y}N$ LEDs may have full widths at half maximum of, for example, about 20 nm to about 50 nm. The red LED may be, for example, an $In_xAl_yGa_{1-x-y}P$ device in which $0 \leq x \leq 1$, $0 \leq y \leq 1$, and $0 \leq x+y \leq 1$. The emission spectrum of such an $In_xAl_yGa_{1-x-y}P$ LED may have a full width at half maximum of, for example, about 13 nm to about 30 nm. Each LED may be packaged in its own conventional light concentrating device, such as a compound parabolic concentrator or a reflector cup of another shape, in order to spatially homogenize the light and to narrow the angular emission pattern.

Figure 2A:
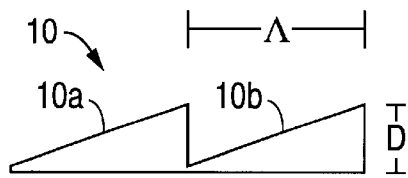
FIGS. 2A and 2B are schematic illustrations of, respectively, blazed and multi-level diffraction gratings.

In one implementation, first-order diffraction grating 2 is a first-order blazed diffraction grating. A two period portion of an example blazed diffraction grating 10 is shown in FIG. 2A. One of ordinary skill in the art will recognize that the grooves of a blazed diffraction grating have faces (such as 10a and 10b) that are cut at an angle (blaze angle) with respect to the surface of the grating. The blaze angle, and hence the depth D of the grooves, can be selected to maximize the diffraction efficiency at a particular wavelength (the blaze wavelength) into a particular diffraction order. In this implementation, first-order diffraction grating 2 is a first-order blazed diffraction grating having a period $\Lambda$ of about 2 microns ($\mu$m) and a groove depth D of about $\lambda_{green}/2$ (~0.27 $\mu$m). This groove depth provides phase delays of up to about $2\pi$ between light waves of wavelength $\lambda_{green}$ reflected in air from adjacent grooves, and corresponds to a blaze wavelength of about 540 nm for first order diffraction in air. Hence, in this implementation first-order diffraction grating 2 is a first-order grating at a wavelength of $\lambda_{green}$.

In FIG. 1 and the following figures, angles of incidence measured clockwise with respect to the normal (e.g., vector 9 in FIG. 1) are positive, and angles of incidence measured counter clockwise with respect to the normal are negative. Angles of diffraction measured clockwise with respect to the normal are negative, and angles of diffraction measured counterclockwise with respect to the normal are positive.

Referring again to FIG. 1, LEDs 4, 6, and 8 are each positioned, in this implementation, about 58 millimeters (mm) from first-order diffraction grating 2 with LED 6 separated from each of LEDs 4 and 8 by about 2 mm. Light rays 4c, 6c, and 8c are incident on diffraction grating 2 at angles of incidence of about, respectively, $\theta_4=-13.6°$, $\theta_6=-15.7°$, and $\theta_8=-17.8°$. The light beams output by LEDs 4, 6, and 8 substantially overlap on diffraction grating 2 in a spot having a $1/e^2$ diameter of about 67 mm. Diffraction grating 2 diffracts a substantial portion of each of these light beams into the same range of directions to form an approximately Gaussian output light beam having edges represented by light rays 12a and 12b. This output light beam exits the grating in a direction substantially perpendicular to grating 2 with an angular divergence (half angle) of about 30°.

Light emitted by LEDs 4, 6, and 8 and diffracted into the output beam is substantially uniformly mixed in all planes through the output beam, on all surfaces on which the output beam is subsequently incident, and from all perspectives. The optical power output by LEDs 4, 6, and 8 can be controlled to vary the color of the output beam. For example, the output powers of LEDs 4, 6, and 8 can be adjusted so that the output beam will appear white to the human eye.

Figure 2B:
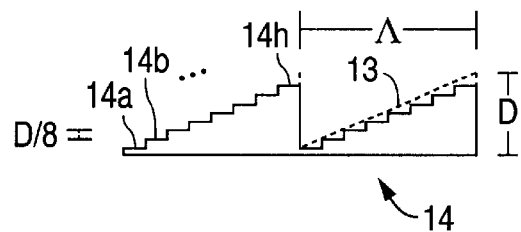

First-order blazed diffraction gratings having small periods can be difficult and/or expensive to manufacture. In some instances, multi-level approximations to first-order blazed gratings can be more easily and less expensively manufactured. FIG. 2B shows a two period portion of an example multi-level diffraction grating 14. Multi-level diffraction grating 14 is an 8-level approximation to the blazed diffraction grating 10 shown in FIG. 2A (and represented by dashed line 13 in FIG. 2B). In particular, the surface structure in one period of multi-level diffraction grating 14 consists of 8 flats (14a–14h) approximately equally spaced at intervals (step sizes) of about D/8 to form 7 stair steps that together approximate the shape of a single groove face of depth D. The performance of such an 8-level approximation to a first-order blazed diffraction grating is similar to the performance of the first-order blazed diffraction grating it approximates.

In a second implementation of the embodiment shown in FIG. 1, first-order diffraction grating 2 is an 8-level approximation to a first-order blazed diffraction grating similar to that shown in FIG. 2B. The period of first-order diffraction grating 2, the locations and emission wavelengths of LEDs 4, 6, and 8, and the shapes, directions, and divergences of the various light beams described above are substantially the same in this implementation as in the first implementation. In this implementation, however, the surface structure within a single period of diffraction grating 2 includes 8 flats spaced at intervals of about $\lambda_{green}/16$ for a total surface relief depth in one period $\Lambda$ of about $(7/8) \times \lambda_{green}/2(\sim 0.24 \mu m)$. This total surface relief depth provides phase delays of up to about $(7/8) \times 2\pi$ between light waves of wavelength $\lambda_{green}$ reflected in air from the surface relief structure of adjacent periods of grating 2. Hence, in this implementation also first-order diffraction grating 2 is a first-order grating at a wavelength of about $\lambda_{green}$.

As in the first implementation, in this implementation first-order diffraction grating 2 diffracts a substantial portion of the light beams emitted by LEDs 4, 6, and 8 into the same range of directions to form an output beam having edges represented by light rays 12a and 12b. The inventors have mathematically modeled the color-mixing performance of the first-order 8-level grating of this implementation. In this model, the profiles of the light beams incident on diffraction grating 2 were conventionally decomposed into a combination of plane waves. The diffraction of these plane waves by diffraction grating 2 was analyzed with the software package GSOLVER© V4.0 available from Grating Solver Development Company of Allen, Tex. The diffracted plane waves were conventionally propagated into the far field and then conventionally recombined to form the diffracted output beam. The angular dependence of the color mixing in this output beam was then characterized.

Figure 3A:
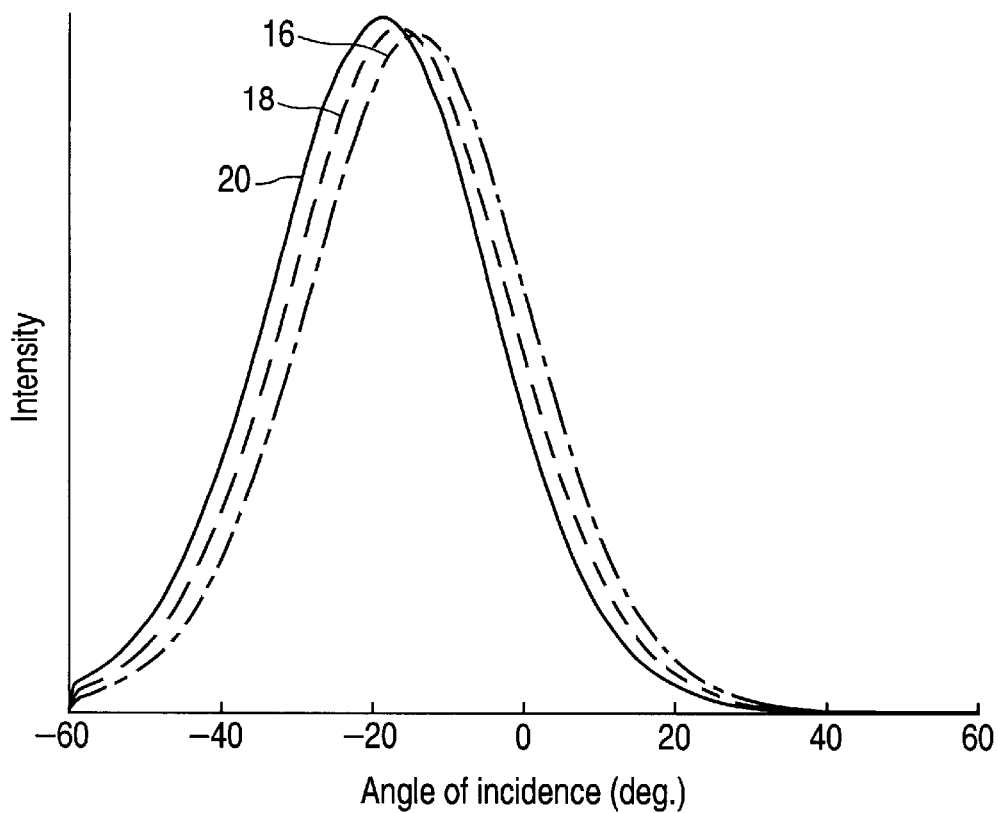
FIGS. 3A–3C are plots showing the inputs to and results of a mathematical model of the performance of an embodiment in accordance with the present invention.
Figure 3B:
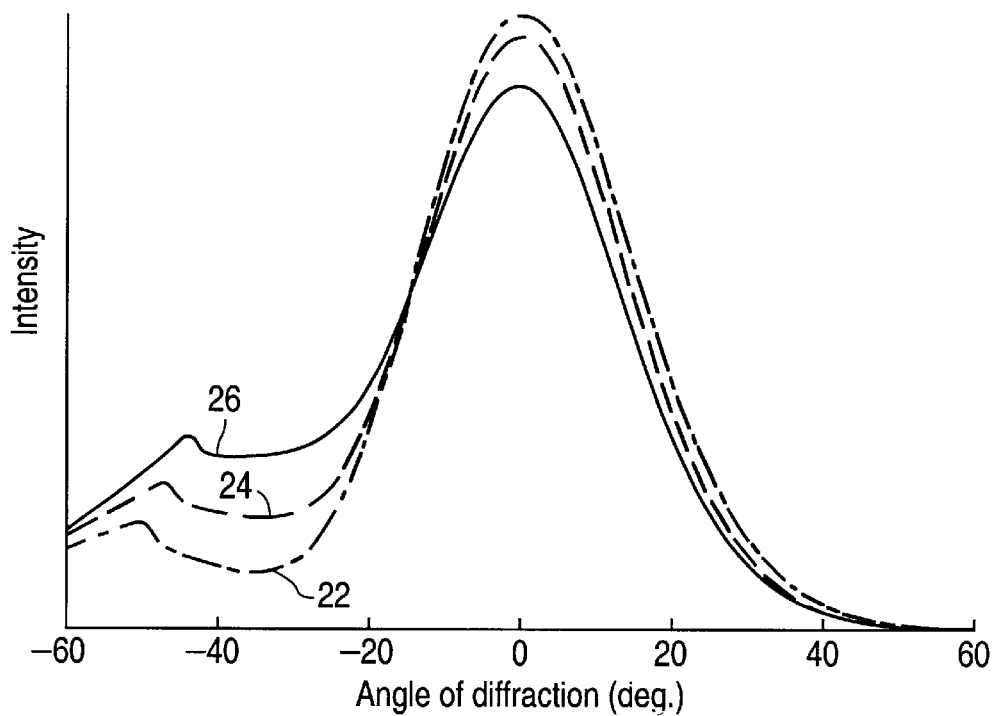
Figure 3C:
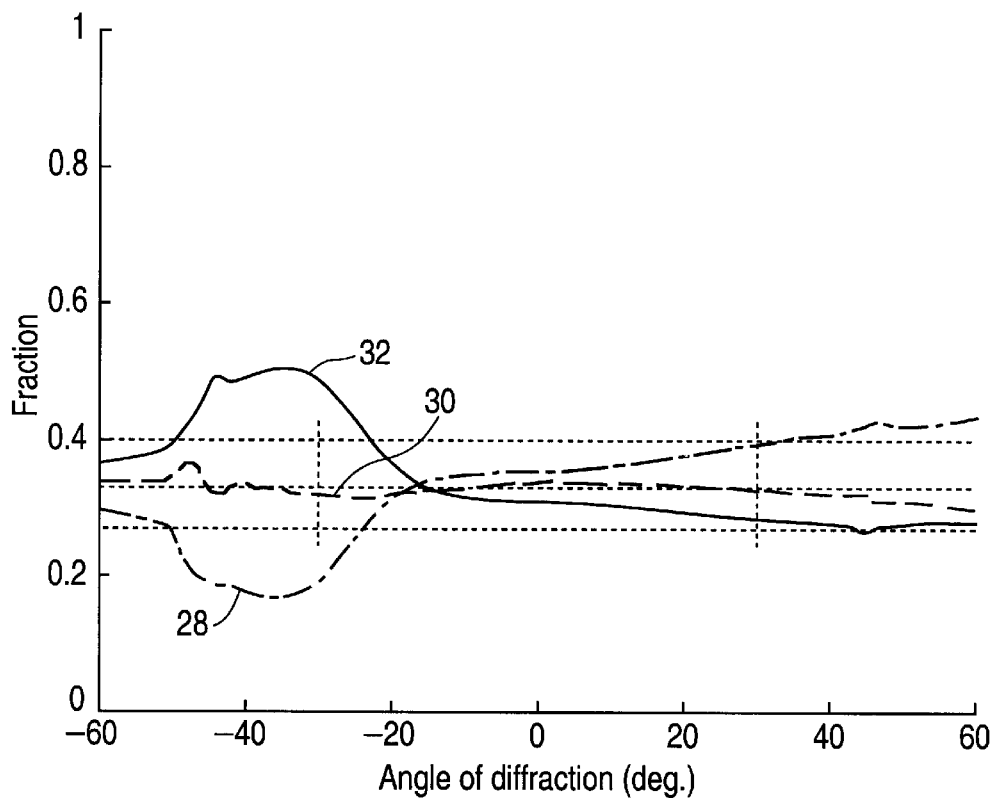

The inputs to and results of the mathematical model for this implementation are shown in FIGS. 3A–3C. FIG. 3A shows a plot of light intensity versus angle of incidence on first-order grating 2 in which curves 16, 18, and 20 represent the angular dependence of the intensity of the light beams emitted by, respectively, LEDs 4, 6, and 8. The optical output powers of LEDs 4, 6, and 8 are chosen to be substantially equal in this model. The peaks of curves 16, 18, and 20 occur at, respectively, $\theta_4$, $\theta_6$, and $\theta_8$ as described above.

FIG. 3B shows a plot of light intensity versus angle of diffraction from first-order grating 2 in this implementation in which curves 22, 24, and 26 represent the resulting angular dependence of the intensity of the light emitted by, respectively, LEDs 4, 6, and 8, and diffracted by first-order grating 2. All three of these curves have a maximum at about 0°. Curves 28, 30, and 32 in the plot shown in FIG. 3C represent the fraction of light in the output beam at each diffraction angle having a wavelength of, respectively, $\lambda_{blue}$ (LED 4), $\lambda_{green}$(LED 6), and $\lambda_{red}$(LED 8). The color of the output beam is considered to be white at diffraction angles for which each of curves 28, 30, and 32 has a value between about 0.27 and about 0.40. Diffraction efficiencies into the central ±30° portion of the output beam were calculated to be about 88% at $\lambda_{blue}$, about 84% at $\lambda_{green}$, and about 79% at $\lambda_{red}$. Hence, the results of this model indicate that in this implementation light emitted by LEDs 4, 6, and 8 can be efficiently diffracted to form a substantially uniformly mixed output beam of white light. It should be noted that the results of this mathematical model also approximately represent the performance of the blazed first-order diffraction grating of the first implementation.

In a third implementation of the embodiment shown in FIG. 1, first-order diffraction grating 2 is a first-order blazed diffraction grating having a period $\Lambda$ of about 2 microns ($\mu$m) and a groove depth D of about $\lambda_{red}/2(\sim 0.305 \mu m)$. This groove depth provides phase delays of up to about $2\pi$ between light waves of wavelength $\lambda_{red}$ reflected in air from adjacent grooves, and corresponds to a blaze wavelength of about 610 nm for first order diffraction in air. Hence, in this implementation first-order diffraction grating 2 is a first-order grating at a wavelength of $\lambda_{red}$. This groove depth was selected to increase the efficiency with which light of wavelength $\lambda_{red}$ is diffracted into the output beam.

The locations and emission wavelengths of LEDs 4, 6, and 8, and the shapes and divergences of the light beams emitted by the LEDs are substantially the same in this implementation as in the implementations described above. In this implementation, however, light rays 4c, 6c, and 8c are incident on diffraction grating 2 at angles of incidence of about, respectively, $\theta_4=-4.7°$, $\theta_6=-6.7°$, and $\theta_8=-8.8°$. These angles of incidence were selected to increase the efficiency with which light of wavelength $\lambda_{red}$ is diffracted into the output beam. As in the above implementations, first-order diffraction grating 2 diffracts a substantial portion of the light beams emitted by LEDs 4, 6, and 8 into the same range of directions to form an output beam having edges represented by light rays 12a and 12b. In this implementation, though, the central rays of the output beam are diffracted from first-order diffraction grating 2 at a diffraction angle of about 8.8°. Hence, recalling the sign conventions for incident and diffracted light defined above, the output beam is directed back toward LED 8. That is, (red) LED 8 and diffraction grating 2 are in a Littrow configuration in this implementation. As in the above implementations, light emitted by LEDs 4, 6, and 8 and diffracted into the output beam is substantially uniformly mixed and may appear, for example, white to the human eye.

In a fourth implementation of the embodiment shown in FIG. 1, first-order diffraction grating 2 is an 8-level approximation to a first-order blazed diffraction grating having a period $\Lambda$ of about 2 microns ($\mu$m) and a surface relief structure including 8 flats spaced at intervals of about $\lambda_{red}/16$ per grating period. The total surface relief depth in one period $\Lambda$ of this grating is thus about $(\frac{7}{8}) \times \lambda_{red}/2 (\sim 0.27$ $\mu$m). This total surface relief depth provides phase delays of up to about $(\frac{7}{8}) \times 2\pi$ between light waves of wavelength $\lambda_{red}$ reflected in air from the surface relief structure of adjacent periods of diffraction grating 2. Hence, in this implementation also first-order diffraction grating 2 is a first-order grating at a wavelength of about $\lambda_{red}$.

The locations and emission wavelengths of LEDs 4, 6, and 8, and the shapes, directions, and divergences of the light beams emitted by the LEDs and of the output light beam diffracted by diffraction grating 2 are substantially the same in this implementation as in the third implementation.

Figure 4A:
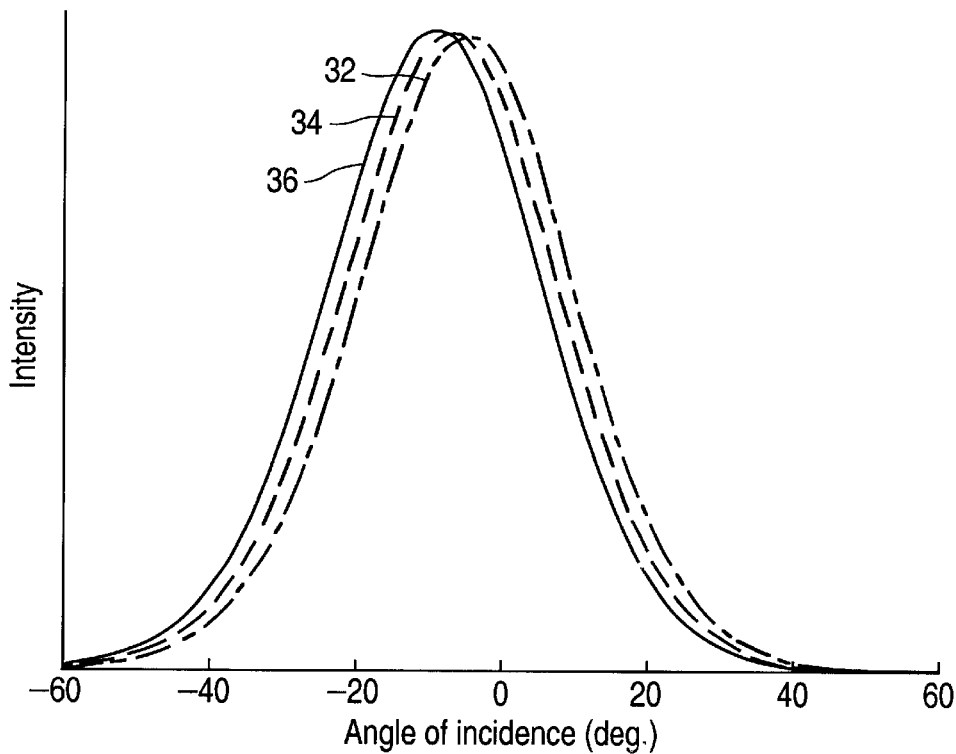
FIGS. 4A–4C are plots showing the inputs to and results of a mathematical model of the performance of another embodiment in accordance with the present invention.
Figure 4B:
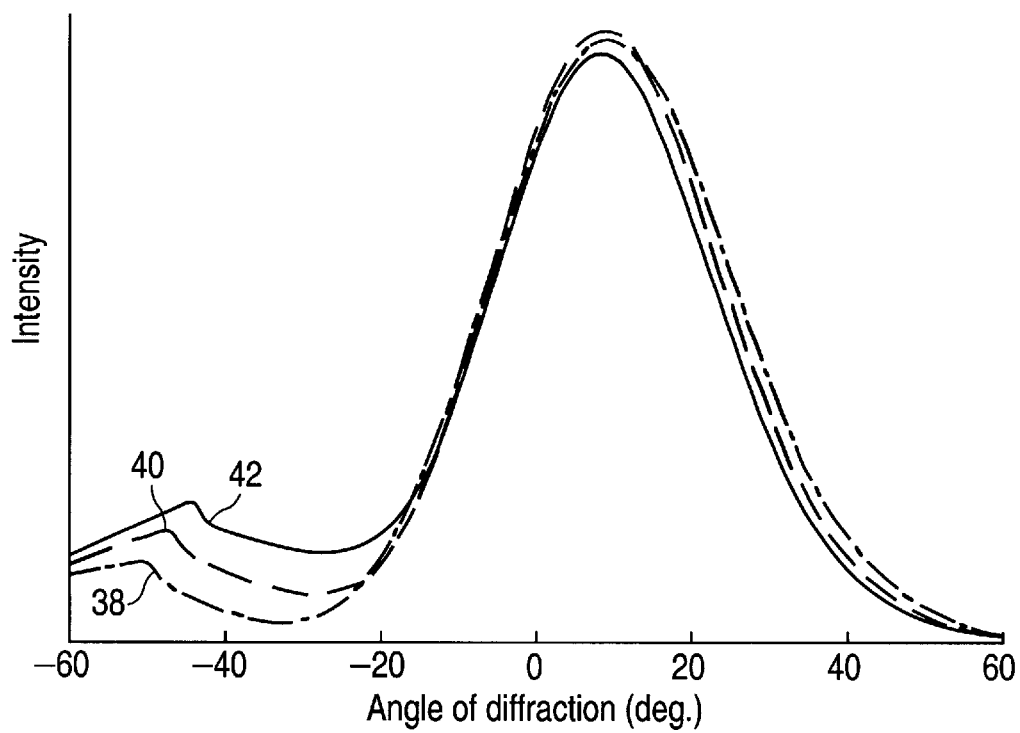
Figure 4C:
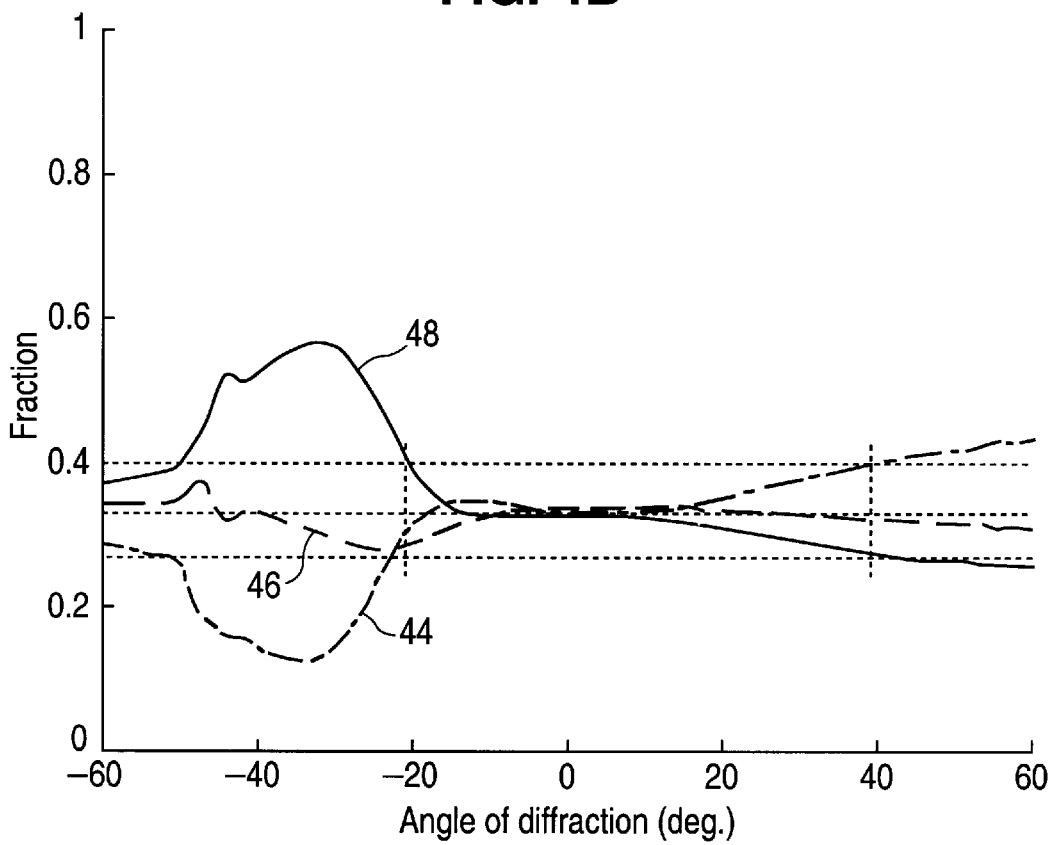

The color mixing performance of the first-order 8-level diffraction grating of this implementation was modeled by methods similar to those described above. The inputs to and results of the mathematical model for this implementation are shown in FIGS. 4A–4C. FIG. 4A shows a plot of light intensity versus angle of incidence on first-order grating 2 in which curves 32, 34, and 36 represent the angular dependence of the intensity of the light beams emitted by, respectively, LEDs 4, 6, and 8. The optical output powers of LEDs 4, 6, and 8 are chosen to be substantially equal in this model. The peaks of curves 32, 34, and 36 occur at, respectively, $\theta_4 \sim -4.7°$, $\theta_6 \sim -6.7°$, and $\theta_8 \sim -8.8°$ as described above.

FIG. 4B shows a plot of light intensity versus angle of diffraction from first-order grating 2 in this implementation in which Curves 38, 40, and 42 represent the resulting angular dependence of the intensity of the light emitted by, respectively, LEDs 4, 6, and 8, and diffracted by first-order grating 2. All three of these curves have a maximum at about 8.8°. Curves 44, 46, and 48 in the plot shown in FIG. 4C represent the fraction of light in the output beam at each diffraction angle having a wavelength of, respectively, $\lambda_{blue}$ (LED 4), $\lambda_{green}$ (LED 6), and $\lambda_{red}$ (LED 8). The color of the output beam is considered to be white at diffraction angles for which each of curves 44, 46, and 48 has a value between about 0.27 and about 0.40. Diffraction efficiencies into the central ±30° portion of the output beam were calculated to be about 90% at $\lambda_{blue}$, about 87% at $\lambda_{green}$, and about 83% at $\lambda_{red}$. Hence, the results of this model indicate that in this implementation as well light emitted by LEDs 4, 6, and 8 can be efficiently diffracted to form a substantially uniformly mixed output beam of white light. It should be noted that the results of this mathematical model also approximately represent the performance of the blazed first-order diffraction grating of the third implementation.

In another class of diffraction gratings used in accordance with embodiments of the present invention the diffraction gratings have surface relief, such as stair steps, which provide phase delays of greater than $2\pi$ at particular design wavelengths for light waves reflected from adjacent periods of the diffraction grating. Such diffraction gratings are referred to herein as "echelon gratings." Echelon gratings can efficiently diffract light of different colors into different diffraction orders, and thus can provide very high wavelength dispersion. The structure of an echelon grating may be similar to that of the multi-level diffraction grating of FIG. 2B, except that the total surface relief depth in one period of an echelon grating provides phase delays greater than $2\pi$ for light waves at the design wavelength reflected from adjacent periods of the grating.

Figure 5:
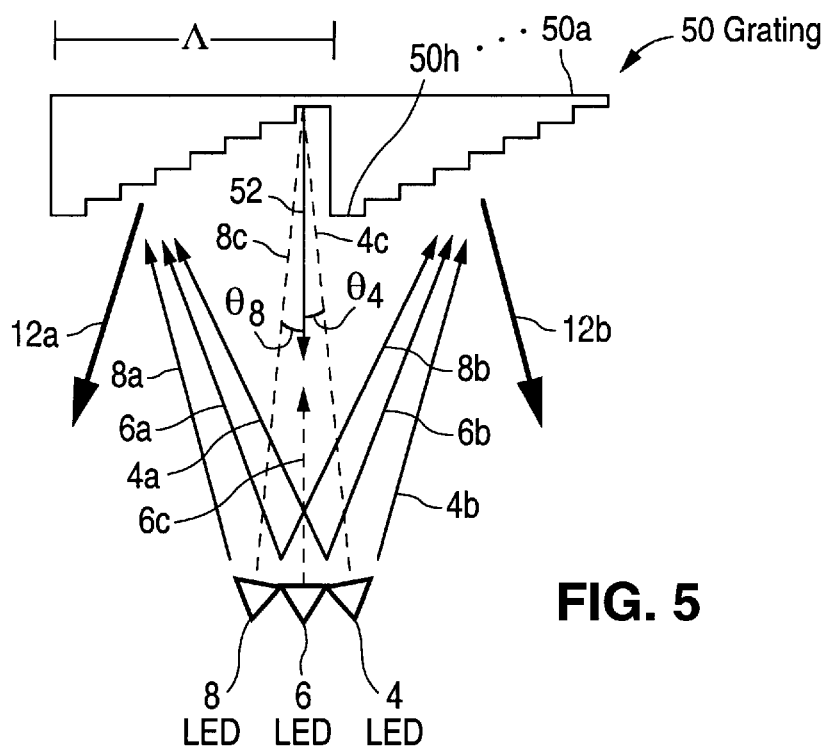
FIG. 5 is a schematic illustration of an optical system including an echelon diffraction grating in accordance with an embodiment of the present invention.

Referring to FIG. 5, for example, in another embodiment of the present invention LEDs 4, 6, and 8 emit beams of light that are directed to overlap on an echelon diffraction grating 50 having a grating period $\Lambda$ of about 6 microns. As in the first embodiment, these light beams are, for example, Gaussian light beams having angular divergences of about 30° and edges and centers represented by light rays 4a–4c, 6a–6c, and 8a–8c. LEDs 4, 6, and 8 emit, respectively, blue, green, and red light with emission spectra centered at about, respectively, $\lambda_{blue} \sim 470$ nm, $\lambda_{green} \sim 540$ nm, and $\lambda_{red} \sim 610$ nm. The LEDs may be, for example, $In_xAl_yGa_{1-x-y}N$ or $In_xAl_yGa_{1-x-y}P$ devices as described above.

In the embodiment shown in FIG. 5, each period $\Lambda$ of echelon diffraction grating 50 includes 8 levels (such as 50a–50h) spaced at intervals of about $\lambda_{green}/2$ for a total surface relief depth in one period of about $(\frac{7}{2}) \times \lambda_{green}$. This total surface relief depth provides phase delays of up to about $7 \times 2\pi$ between light waves of wavelength $\lambda_{green}$ reflected in air from the surface relief structure of adjacent periods of echelon grating 50.

LEDs 4, 6, and 8 are each positioned, in this embodiment, about 25 mm from echelon diffraction grating 50 with LED 6 separated from each of LEDs 4 and 8 by about 2 mm. Light rays 4c, 6c, and 8c are incident on echelon grating 50 at angles of about, respectively, $\theta_4 = -4.5°$, $\theta_6 = 0.0°$, and $\theta_8 = 5.8°$ measured with respect to vector 52 oriented perpendicular to echelon grating 50. The light beams output by LEDs 4, 6, and 8 substantially overlap on echelon diffraction grating 50 in a spot having a $1/e^2$ diameter of about 29 mm. Echelon diffraction grating 50 diffracts a substantial portion of each of these light beams into the same range of directions to form an approximately Gaussian output light beam having edges represented by light rays 12a and 12b. This output light beam is directed in a direction substantially perpendicular to echelon grating 50 with an angular divergence (half angle) of about 30°.

Figure 6A:
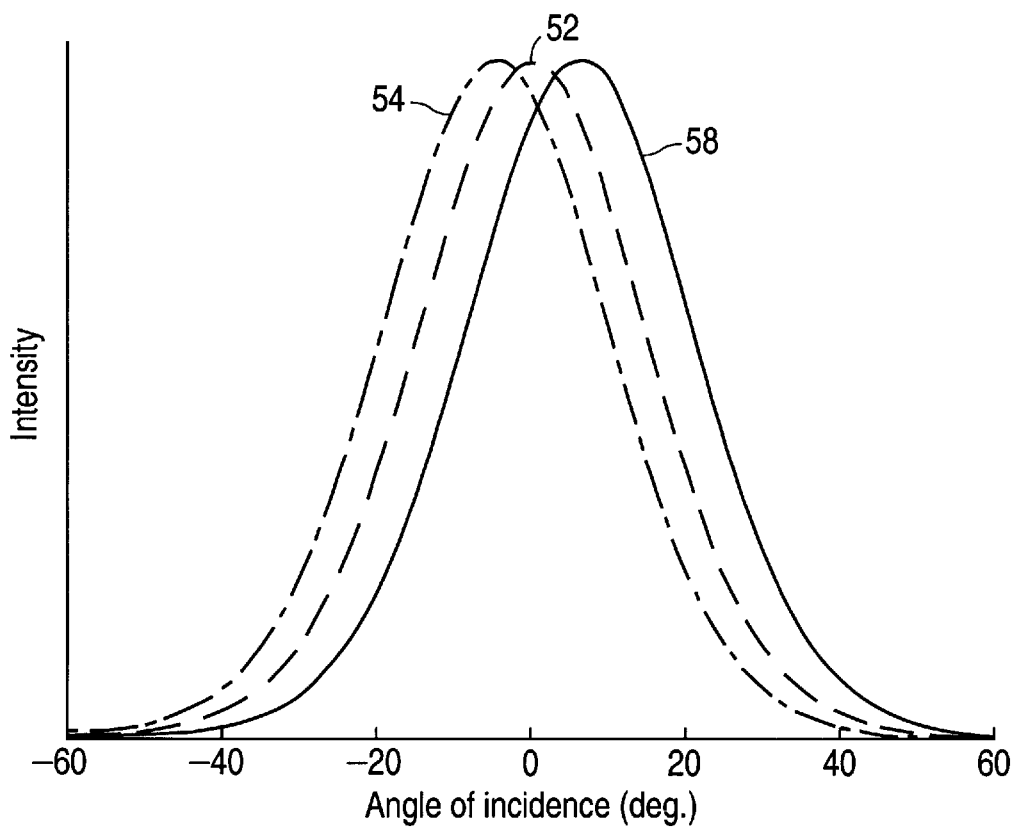
FIGS. 6A–6C are plots showing the inputs to and results of a mathematical model of the performance of another embodiment in accordance with the present invention.
Figure 6B:
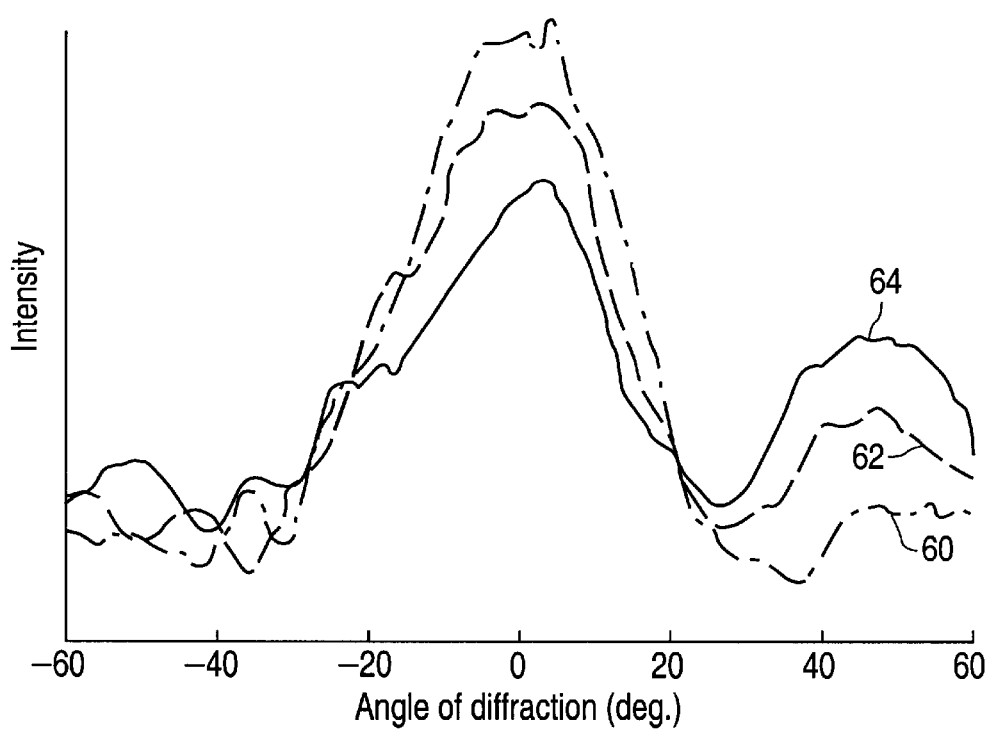
Figure 6C:
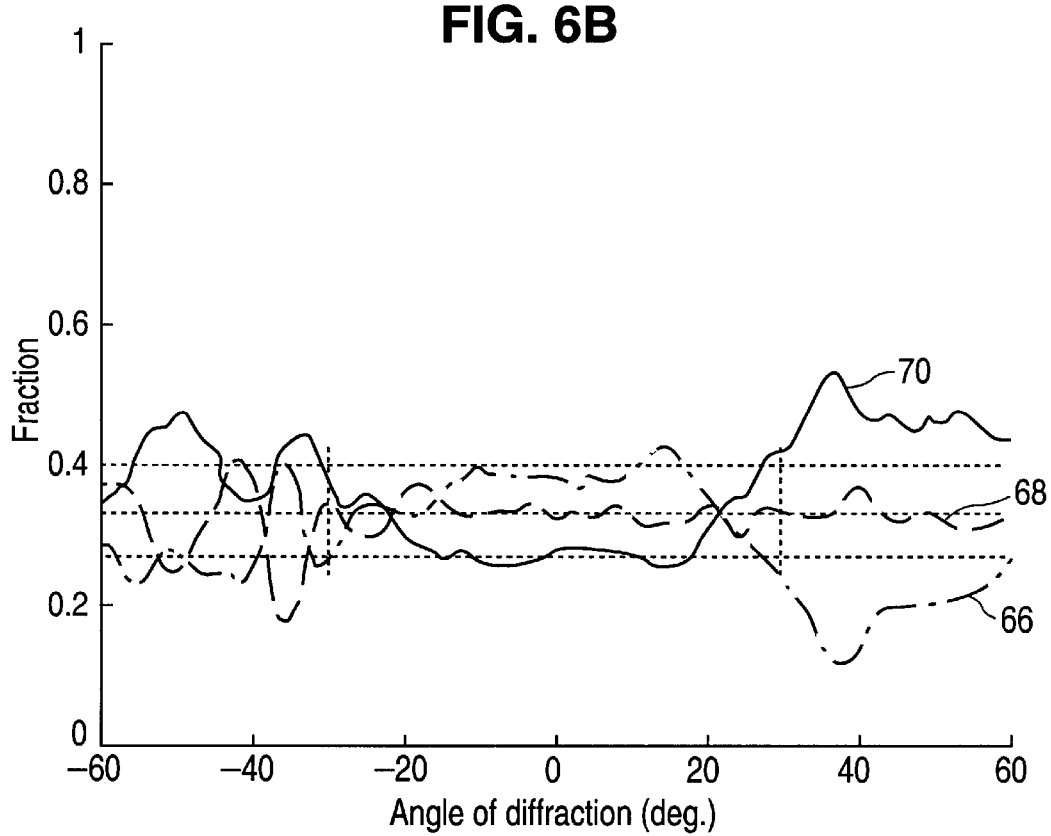

The color mixing performance of 8-level echelon diffraction grating 50 of this embodiment was modeled by methods similar to those described above. The inputs to and results of the mathematical model for this embodiment are shown in FIGS. 6A–6C. FIG. 6A shows a plot of light intensity versus angle of incidence on echelon grating 50 in which curves 54, 56, and 58 represent the angular dependence of the intensity of the light beams emitted by, respectively, LEDs 4, 6, and 8. The optical output powers of LEDs 4, 6, and 8 are chosen to be substantially equal in this model. The peaks of curves 54, 56, and 58 occur at, respectively, $\theta_4 \sim 4.5°$, $\theta_6 \sim 0.0°$, and $\theta_8 \sim 5.8°$ as described above.

FIG. 6B shows a plot of light intensity versus angle of diffraction from echelon grating 50 in which Curves 60, 62, and 64 represent the resulting angular dependence of the intensity of the light emitted by, respectively, LEDs 4, 6, and 8, and diffracted by echelon grating 50. All three of these curves have a maximum at about 0.0°. Curves 66, 68, and 70 in the plot shown in FIG. 6C represent the fraction of light in the output beam at each diffraction angle having a wavelength of, respectively, $\lambda_{blue}$ (LED 4), $\lambda_{green}$ (LED 6), and $\lambda_{red}$ (LED 8). The color of the output beam is considered to be white at diffraction angles for which each of curves 66,

68, and 70 has a value between about 0.27 and about 0.40. Diffraction efficiencies into the central ±30° portion of the output beam were calculated to be about 74% at $\lambda_{blue}$, about 66% at $\lambda_{green}$, and about 56% at $\lambda_{red}$. Hence, the results of this model indicate that in this embodiment as well light emitted by LEDs 4, 6, and 8 can be efficiently diffracted to form a substantially uniformly mixed output beam of white light.

The results of the mathematical models described above indicate that color mixing of the outputs of two or more LEDs in accordance with an embodiment of the present invention may be more efficient and more uniform when performed with first-order diffraction gratings than when performed with echelon diffraction gratings. However, an optical system that mixes the output of two or more LEDs with an echelon grating in accordance with an embodiment of the present invention may be more compact than a similar system utilizing a first-order grating.

Figure 7A:
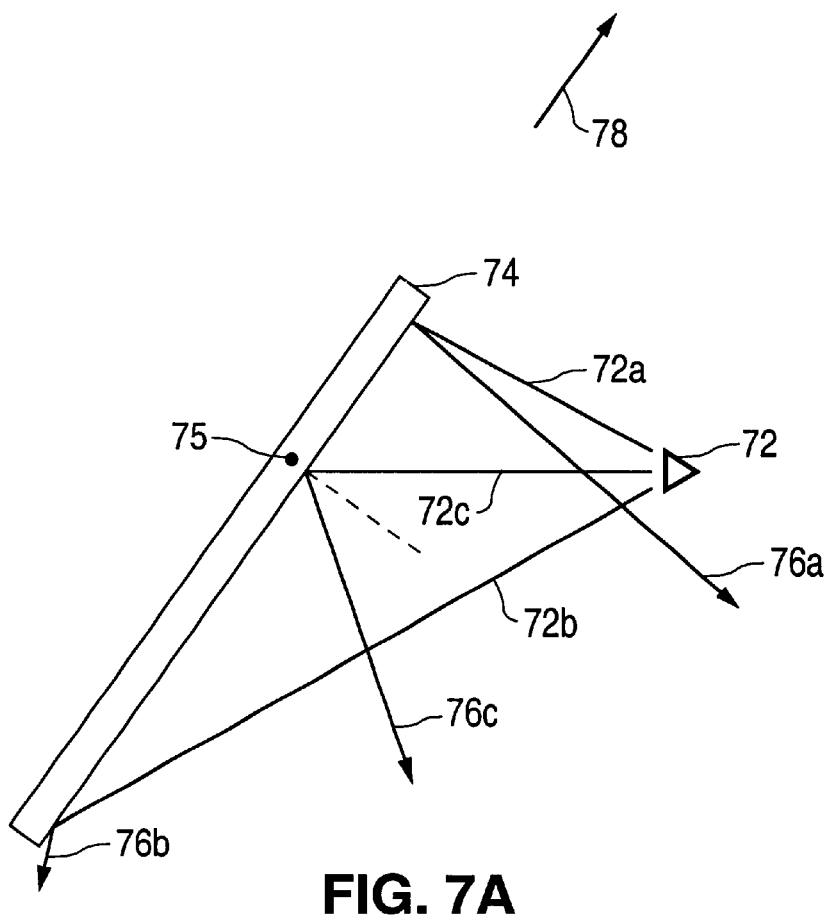
FIGS. 7A and 7B are schematic illustrations of an optical system including a diffraction grating tilted to direct an output beam around one or more LEDs in accordance with an embodiment of the present invention.

FIGS. 1 and 5 show top views of embodiments in which a diffraction grating is used in a reflection geometry. In such embodiments it is possible for LEDs 4, 6, and 8 to block a portion of the diffracted output beam. However, the diffracted output beam can be directed around the LEDs without substantially affecting the color mixing by tilting the diffraction grating about an axis located in the plane of the grating and directed in the direction of periodicity of the grating (e.g., directed perpendicular to the grooves). For example, FIG. 7A shows a side view of an embodiment in which an LED 72 outputs a beam of light incident on a diffraction grating 74. Other LEDs may be present in this embodiment but hidden by LED 72 in this side view. The edges and center of the beam of light emitted by LED 72 are represented by light rays 72a–72c. The grooves of diffraction grating 74 run parallel to vector 78. Diffraction grating 74 is tilted about an axis 75 in the plane of diffraction grating 74 and perpendicular to vector 78 (and hence directed in the direction of periodicity of grating 74) to form an output light beam having edges and center represented by light rays 76a–76c and not blocked by LED 72.

Figure 7B:
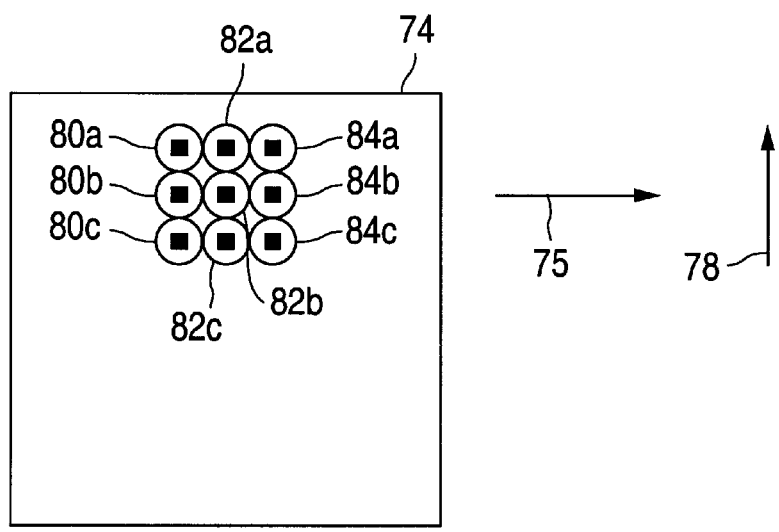

In embodiments in which the diffraction grating is tilted to direct the output beam around the LEDs, the power of the diffracted output beam may be increased by arranging multiple LEDs having substantially identical emission spectra in columns parallel to the periodic structure of the grating. For example, FIG. 7B shows a front view of an embodiment in which diffraction grating 74, tilted as described above, is illuminated by a first column of LEDs including LEDs 80a–80c, a second column of LEDs including LEDs 82a–82c, and a third column of LEDs including LEDs 84a–84c. Although FIG. 7B shows nine LEDs arranged in three columns, either more or fewer than nine LEDs may be arranged in either more or fewer than three columns. Typically, the total number of LEDs used and the number of columns in which they are arranged depends on the desired output power of the diffracted beam and the number of different colors of LEDs required.

While the present invention is illustrated with particular embodiments, the invention is intended to include all variations and modifications falling within the scope of the appended claims. For example, although the illustrated embodiments employ diffraction gratings, other types of diffractive optical elements such as, for example, holograms, may also be used in accordance with embodiments of the present invention. Moreover, diffractive optical elements may be employed in accordance with the present invention in transmission geometries as well as in the illustrated reflection geometries. That is, the diffracted output beam may pass through the diffractive optical element rather than be diffracted back toward the LEDs. For example, grating 2 of FIG. 1 and grating 50 of FIG. 5 may each be transmission gratings. In embodiments employing transmission gratings the locations of the LEDs, the angles of incidence of the light beams, the periodicities of the gratings, and the phase delays provided by the gratings may be as described above with respect to embodiments employing gratings in reflection geometries.

Although diffraction gratings having particular grating periods Λ have been described, other values of Λ either greater or less than the recited values may also be used. Similarly, multi-level diffraction gratings having more or less than the illustrated eight levels per grating period may be used. The various levels in a multi-level diffraction grating need not be equally spaced.

Although in the illustrated embodiments beams of light output by three or more LEDs are combined by a diffractive optical element to form an output beam of light, other embodiments may employ only two LEDs. The light beams emitted by the (two or more) LEDs may be incident on the diffractive optical element at angles of incidence other than those illustrated. Moreover, in other embodiments the emission spectra of the LEDs may differ from those described above. Consequently, the output beam of light need not be white.

Light emitting diodes employed in accordance with the present invention may be semiconductor laser diodes.

We claim:

1. A light emitting device comprising:
    a diffractive optical element;
    a first light emitting diode emitting first light having a first range of wavelengths, said first light directed onto said diffractive optical element at a first range of angles of incidence; and
    a second light emitting diode emitting second light having a second range of wavelengths, said second light directed onto said diffractive optical element at a second range of angles of incidence;
    wherein said first light and said second light substantially overlap on said diffractive optical element and said diffractive optical element diffracts at least a portion of said first light and at least a portion of said second light into a same range of angles of diffraction to obtain light having a desired range of wavelengths.

2. The light emitting device of claim 1, wherein said diffractive optical element is a diffraction grating.

3. The light emitting device of claim 1, wherein said diffractive optical element is a diffraction grating providing phase delays of about 0 to about $2\pi$ for light of a wavelength emitted by one of said light emitting diodes and reflected from adjacent periods of said diffraction grating.

4. The light emitting device of claim 1, wherein said diffractive optical element is a diffraction grating providing phase delays of greater than $2\pi$ for light of a wavelength emitted by one of said light emitting diodes and reflected from adjacent periods of said diffraction grating.

5. The light emitting device of claim 1, wherein said diffractive optical element is a blazed diffraction grating.

6. The light emitting device of claim 1, wherein said diffractive optical element is a diffraction grating including multiple levels of different heights in a single period.

7. The light emitting device of claim 1, wherein said diffractive optical element is used in a reflection geometry.

8. The light emitting device of claim 1, wherein said diffractive optical element is used in a transmission geometry.

9. The light emitting device of claim 1, wherein said diffractive optical element provides a white light output including said portion of said first light and said portion of said second light.

10. The light emitting device of claim 1, wherein said portion of said first light and said portion of said second light are substantially spatially and angularly overlapped.

11. The light emitting device of claim 1, wherein said diffractive optical element is tilted about an axis directed in a direction of periodicity of said diffractive optical element such that said portion of said first light and said portion of said second light are not directed onto said light emitting diodes.

12. The light emitting device of claim 1, further comprising a third light emitting diode emitting third light having a third range of wavelengths, said third light directed onto said diffractive optical element at a third range of angles of incidence, wherein said diffractive optical element diffracts at least a portion of said third light into said same range of angles of diffraction as said portion of said first light and said portion of said second light.

13. The light emitting device of claim 1, wherein said first light emitting diode is one of a plurality of light emitting diodes each emitting light having said first range of wavelengths and directed onto said diffractive optical element at said first range of angles of incidence.

14. The light emitting device of claim 1, wherein said first light emitting diode is a semiconductor laser diode.

15. A light emitting device comprising:
   a diffraction grating;
   a first light emitting diode emitting blue light, said blue light directed onto said diffraction grating at a first range of angles of incidence;
   a second light emitting diode emitting green light, said green light directed onto said diffraction grating at a second range of angles of incidence; and
   a third light emitting diode emitting red light, said red light directed onto said diffraction grating at a third range of angles of incidence;
   wherein said blue light, said green light, and said red light substantially overlap on said diffraction grating and said diffraction grating diffracts at least a portion of said blue light, at least a portion of said green light, and at least a portion of said red light into a same range of angles of diffraction to thereby form a white light output.

16. A method of mixing light emitted by a plurality of light emitting diodes, the method comprising:

directing first light emitted by a first light emitting diode and having a first range of wavelengths onto a diffractive optical element at a first range of angles of incidence; and directing second light emitted by a second light emitting diode and having a second range of wavelengths onto said diffractive optical element at a second range of angles of incidence such that said first light and said second light substantially overlap on said diffractive optical element, and such that at least a portion of said first light and at least a portion of said second light are diffracted into a same range of angles of diffraction to obtain light having a desired range of wavelengths.

17. The method of claim 16, wherein said diffractive optical element is a diffraction grating.

18. The method of claim 16, wherein said diffractive optical element is a diffraction grating providing phase delays of about 0 to about $2\pi$ for light of a wavelength emitted by one of said light emitting diodes and reflected from adjacent periods of said diffraction grating.

19. The method of claim 16, wherein said diffractive optical element is a diffraction grating providing phase delays of greater than $2\pi$ for light of a wavelength emitted by one of said light emitting diodes and reflected from adjacent periods of said diffraction grating.

20. The method of claim 16, wherein said diffractive optical element is a blazed diffraction grating.

21. The method of claim 16, wherein said diffractive optical element is a diffraction grating including multiple levels of different heights in a single period.

22. The method of claim 16, further comprising providing a white light output including said portion of said first light and said portion of said second light.

23. The method of claim 16, further comprising tilting said diffractive optical element about an axis directed in a direction of periodicity of said diffractive optical element such that said portion of said first light and said portion of said second light are not directed onto said light emitting diodes.

24. The method of claim 16, further comprising directing third light emitted by a third light emitting diode and having a third range of wavelengths onto said diffractive optical element at a third range of angles of incidence such that at least a portion of said third light is diffracted into said same range of angles of diffraction as said portion of said first light and said portion of said second light.

* * * * *